May 4, 1965  D. W. DORSCH ETAL  3,182,253
WIRING TESTER INCLUDING A STANDARD UNIT AND
A SELECTIVE SWITCH MEANS
Filed June 13, 1960  2 Sheets-Sheet 1

*INVENTORS*
DANIEL W. DORSCH
RAYMOND L. WOODWARD
BY LEON A. ROVELSKY

AGENT

INVENTORS
DANIEL W. DORSCH
RAYMOND L. WOODWARD
BY LEON A. ROVELSKY

Edward A. Sokolski
AGENT

United States Patent Office 3,182,253
Patented May 4, 1965

3,182,253
WIRING TESTER INCLUDING A STANDARD UNIT AND A SELECTIVE SWITCH MEANS
Daniel W. Dorsch, La Habra, Raymond L. Woodward, Lakewood, and Leon A. Rovelsky, Seal Beach, Calif., assignors to North American Aviation, Inc.
Filed June 13, 1960, Ser. No. 35,538
6 Claims. (Cl. 324—51)

This invention relates to a wiring tester and more particularly to such a tester which is capable of rapidly checking the wiring of a unit under test against that of a corresponding standard unit.

The checking of the wiring in a complicated piece of electronic equipment, such as a digital computer, which may have in the neighborhood of 12,000 wiring terminals can be a time consuming, laborious task if done by checking individual connections against a wiring list. Furthermore, point by point continuity checking, due to its monotony, tends to be particularly prone to human error which makes the complete checkout of a complicated electronic system an expensive task requiring a moderate amount of training for the personnel involved. In order to overcome this problem, many commercial automatic circuit testers have been developed. Some of these use programming techniques in which the desired wiring connections are programmed in through a punched card of a magnetic tape. Many, however, do not have the circuit capacity necessary to completely check the wiring in a complicated piece of electronic equipment and must be adapted to check the equipment in sections. These circuit testers are often very complicated in themselves and prone to breakdown. The device of this invention provides a simple yet effective wiring tester intrinsically capable of handling the most complicated circuit. The device is simple to operate and requires a minimum amount of operator training. At the same time, it is capable of accomplishing very rapid yet accurate wiring checkout. The device of this invention accomplishes this end result by checking the wiring of the electrical unit under test against that of a standard unit by alternately connecting a voltage source to corresponding terminals on the electrical unit under test and the standard unit. Each terminal of the standard unit and the corresponding terminal of the unit under test is fed to an indicator device which may, for example, comprise a neon lamp. Discrepancies between the wiring of the unit under test and the standard unit are indicated by the indicator devices, for example, by a flashing or wavering. In this manner, the exact location of a wiring error can be determined by appropriate identification of the indicator device indicating such a discrepancy.

It is therefore an object of this invention to provide a simple yet highly effective wiring tester.

It is a further object of this invention to facilitate the testing of the wiring of complicated electronic circuitry.

It is still a further object of this invention to provide a wiring tester capable of handling a greater number of wiring connections than devices heretofore available.

It is still another object of this invention to provide a wiring tester having great reliability over long periods of operation.

Other objects of this invention will become apparent as the description proceeds with reference to the accompanying drawings in which.

Figure 1:
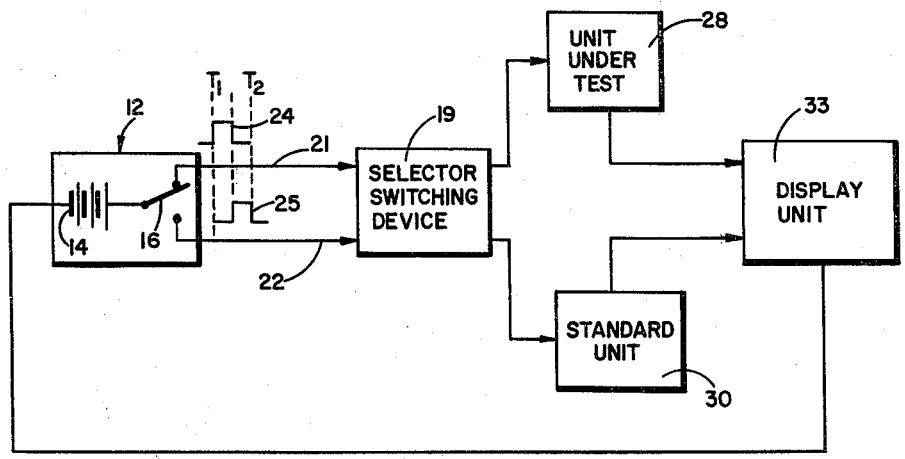
FIG. 1 is a block diagram illustrating the operation of the device of the invention.

Referring to FIG. 1, a block diagram of the device of the invention is illustrated. A test signal is generated by test signal generator 12. Test signal generator 12 comprises a D.-C. power source 14, a switch 16 and a drive mechanism (not shown) for switch 16. The details of a drive mechanism which may be utilized for switch 16 will be described in detail further on in the specification in connection with FIG. 3.

One terminal of power source 14 is alternately connected to selector switching device 19 through the contacts of switch 16. Switch 16 is driven by its drive mechanism (not shown) so that it provides D.-C. voltage to lines 21 and 22 during substantially equal periods. The D.-C. voltages during the periods $T_1$ and $T_2$ indicated in FIG. 1 to lines 21 and 22 may be represented by square waves 24 and 25 respectively. Selector switching device 19 connects the voltage on line 21 to a selected terminal in unit under test 28 and simultaneously connects the voltage on line 22 to a corresponding terminal in standard unit 30. Each of the terminals in the unit under test 28 is connected to a separate properly identified indicator device (not shown) in display unit 33. Similarly, each of the terminals of standard unit 30 is connected to a separate indicator device in display unit 33 which is connected to the corresponding terminal in the unit under test 28.

Standard unit 30 must be a unit corresponding to unit under test 28, the wiring of which has been completely checked out prior to the commencement of the test, so that it establishes a proper reliable test reference with which the unit under test can be compared. Each of the indicator devices of display unit 33, as will be explained further on in the specification, should be appropriately identified with a separate one of the terminals in the unit under test and the standard unit so that the location of wiring discrepancies may be accurately identified in accordance with the display indicated thereby.

Figure 2:
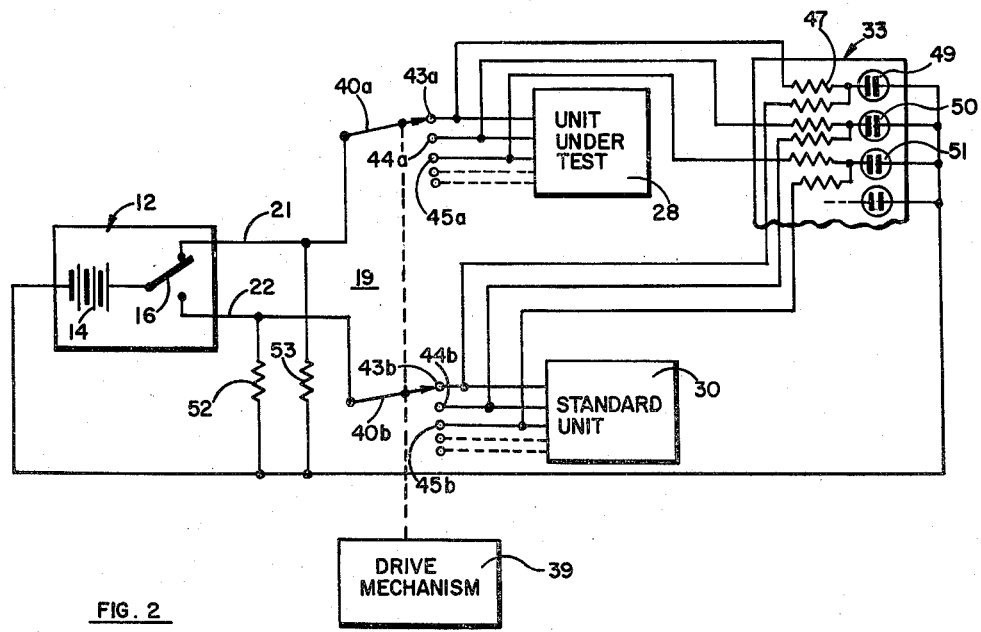
FIG. 2 is a functional block diagram of a preferred embodiment of the device of the invention.

Referring now to FIG. 2, the operation of a preferred embodiment of the device of the invention is illustrated. Test signal generator 12 has a D.-C. power source 14 connected to the movable arm of switch 16. Switch 16 is driven by means, to be described further on in the specification in connection with FIG. 3, so that it alternately makes contact with lines 21 and 22 at a rate of approximately five times a second. Line 21 is connected to the movable arm 40a of selector switching device 19 while line 22 is connected to the movable arm 40b of this same selector switching device. Movable arms 40a and 40b of selector switching device 19 are driven by drive mechanism 39, which is also part of selector switching device 19, to make sequential contact with corresponding fixed contacts 43a, 44a, 45a, etc., and 43b, 44b, 45b, etc., associated therewith. Selector switching device 19 may comprise a stepping switch having two series or "gangs" of contacts. A stepping switch fixed contact, e.g., 43a, 44a, 45a must be provided for each of the terminals to be tested in the unit under test 28 and a corresponding contact, e.g., 43b, 44b, or 45b must likewise be provided for each of the terminals of standard unit 30. Each of the terminals in the unit under test 28 is connected through a resistor 47 to a correspondingly identified neon lamp 49, 50, 51, etc., in display unit 33. Each of the terminals in standard unit 30 is connected through a resistor 47 to the neon lamp 49, 50, 51, etc., in display unit 33 to which the corresponding terminal in the unit under test is connected.

Resistors 47 are used to limit the current to the neon lamps. Resistors 52 and 53 form separate voltage dividers in conjunction with the associated resistor 47 in display unit 33 to which they are connected through switching device 19. These resistors 52 and 53 must be so chosen that when power source 14 is connected to the unit under test 28, the voltage applied to the neon lamp, to which the stepping switch makes connection through resistor 47, will not apply a high enough voltage to the associated terminal in standard unit 30 to ignite any of its neon lamps, with the same being true for unit under test 28 when the power source is connected to the standard unit 30. It is to be noted that a great number of neon lamps and associated terminals on the standard unit and the unit under test are contemplated. In an operative embodiment of the device of the invention, there are in the neighborhood of 12,000 of such neon lamps. The stepping switch 19 may have a pair of separate cables with appropriate plugs attached thereto so that connection may separately be made with the various receptacles in the unit under test and standard unit.

The device illustrated in FIG. 2 operates as follows: When switch 16 is in the up position, and assuming that the stepping switch is positioned with movable arm 40a in contact with fixed contact 43a, power is applied from power source 14 through line 21 and the contacts of stepping switch 19 through current limiting resistor 47 to neon lamp 49 in display unit 33. The negative terminal of power source 14 is connected to one of the terminals of each of the neon lamps. The voltage applied from power source 14 directly to a neon lamp through stepping switch 19 is of sufficient magnitude to ignite the connected lamp. Certain of the terminals 44a, 45a, etc., of the unit under test 28 will be connected in the internal wiring of this unit to terminal 43a. These terminals will therefore have the same voltage applied thereto as will 43a and their associated neon lamps will also ignite. When switch contact 16 is in the down position, connecting power source 14 to the standard unit through contact 43b, the neon lamp 49 connected to this terminal will glow. Similarly, certain of the terminals 44b, 45b, etc., will be connected to terminal 43b and their associated neon lamps will also glow. If the corresponding terminals in the unit under test are connected in accordance with those in the standard unit 30, then the associated neon lamps will be ignited when switch lamp 16 is in both the up and down positions. This will make these lamps appear to the eye with a relatively steady glow, the ten interruptions per second which occur while switch 16 is moving from the up to the down position and back again being too rapid to give a flickering indication to the eye. Any lamps 49, however, which are ignited in either only the up position of switch 16 or the down position due to a non-correspondence between the wiring and the standard unit and the unit under test will glow only approximately half the time. The resultant illumination and nonillumination of these lamps occurring five times per second will give a flashing indication to the eye. Such an indication will identify a wiring error at the particular terminals whose associated neon lamps are flashing. The precise location of the source of the difficulty can be pinpointed by making an additional check as will be explained with reference to FIG. 3. It thus can be seen that the device of the invention provides a simple means for determining wiring errors in the unit under test, the location for such error being identified by a particular flashing neon lamp. Each of neon lamps 49, 50, 51, etc., is identified by a proper notation next to it on the display unit which indicates the associated terminals 43a, 44a, or 45a, etc., in the unit under test 28 and 43b, 44b, or 45b, etc., in the standard unit 30 so that the location of wiring errors can be determined.

Figure 3:
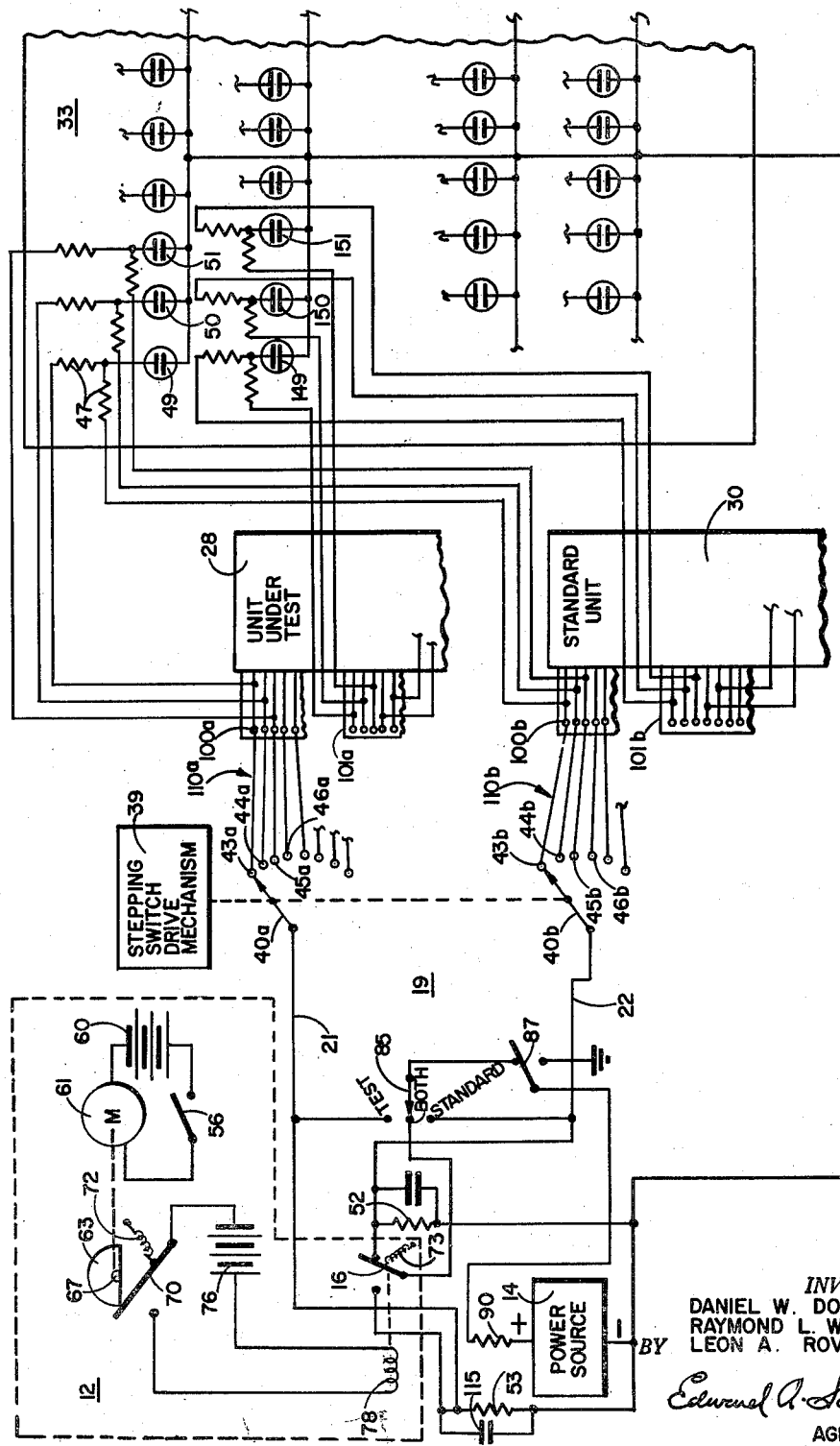
FIG. 3 is a schematic diagram showing the details of the embodiment illustrated in FIG. 2.

Referring now to FIG. 3, a functional schematic diagram of a preferred embodiment of the device of the invention is shown. In this diagram, the same numerals are utilized to identify like components shown in FIG. 2. Operation of the device is initiated by throwing switch 56 in switching device 12 so that the power is supplied from power source 60 to motor 61. Motor 61 rotates cam 63 about an axis 67. Switch 70 is normally held opened by means of spring 72 attached thereto. Switch 70 will be periodically closed and open in accordance with the rotation of cam 63. The cam 63 should be so shaped and positioned that switch 70 will alternately close and open in accordance with the rotary motion of cam 63 with the periods during which the switch is opened and closed being approximately equal. As switch 70 alternately opens and closes, it will alternately apply power from power source 76 to relay winding 78 and disconnect the power therefrom.

The switch contact 16 of relay winding 78 is normally held to the right-hand side, i.e., making connection to resistor 52, by the action of spring 73. Relay contact 16 will be drawn to the left-hand position, that is, so that it makes contact with resistor 53 in accordance with the energization of relay winding 78 which is associated therewith. Thus, relay contact 16 will alternately make contact with resistor 52 and resistor 53 in accordance with the rotation of cam 63. As already noted, cam 63 is shaped and positioned to close switch 70 for approximately the same time period as the switch is opened. Therefore, relay winding 78, which is actuated in accordance with the closing of switch 70, will cause its switch contact 16 to be in the left-hand and the right-hand positions for equal periods of time. Motor 61 and cam 63 rotate at approximately five rotations per second to make contact 16 move from the right-hand to the left-hand position and back again approximately five times per second.

For checking the wiring of a unit under test 28 against that of a standard unit 30, switch 85 is thrown to the "both" position as shown. Switch 87 is kept in the up position as indicated except when making short checks. With switches 85 and 87 in the position indicated in FIG. 3, the positive terminal of power source 14 will be connected through current limiting resistor 90, switch 87 and switch 85 to the movable contact of switch 16. The positive terminal of power source 14 will therefore be connected through the aforementioned components and switch 16 alternately to the movable contact 40a of stepping switch 19 and the movable contact 40b of the same stepping switch. This will alternately supply power to a selected fixed contact 43a, 44a, 45a, or 46a, etc., in the portion of the stepping switch connected to unit under test 28 and the corresponding selected terminal 43b, 44b, 45b, or 46b, etc., connected to standard unit 30. Each of the terminals in unit under test 28 is connected through a current limiting resistor 47 to a separate properly identified neon lamp 49, 50, or 51, etc., in display unit 33 while each of the terminals in standard unit 30 is connected through a current limiting resistor 47 to the same neon lamp 49, 50, or 51, etc., to which the corresponding terminal in the unit under test 28 is connected. In most cases the unit under test and the standard unit will have a great number of input receptacles to which the terminals therein are connected. In a unit having in the neighborhood of 12,000 terminals, it would be impractical to have a stepping switch having an equivalent number of contacts. Therefore, appropriate cables 110a and 110b each having a plug (not shown) which will mate with each of the corresponding receptacles 100a, 101a, and 100b, 101b, etc., in the unit under test and the standard unit respectively may be used to connect the stepping switch terminals to corresponding jacks in the unit under test and the standard unit. In this manner, a unit can be tested out using a stepping switch having a limited number of contacts by connecting the stepping switch contacts successively to each corresponding pair of jacks 100a, 100b, 101a, 101b, etc., in the unit under test and the standard unit until all of the terminals in the unit under test have been checked out.

One of the terminals of each of the neon lamps 49, 50, 51, etc., in display unit 33 is connected to the negative terminal of power source 14 while each of the other terminals of these neon lamps is connected through a current limiting resistor 47 to a separate terminal in the standard unit and the corresponding terminal in the unit under test. To avoid over complicating the drawing, such connections are only shown for neon lamps 49–51 and 149–151 but it is to be understood that each and every one of the neon lamps in display unit 33 is similarly connected through a resistor 47 to a terminal in the unit under test and the standard unit as well as to the negative terminal of power source 14.

As switch 16 oscillates between its two positions, it will alternately supply power to a terminal in the unit under test and the corresponding terminal in the standard unit. The neon lamp connected to the terminal to which the power is applied to the stepping switch 19 will glow as well as the neon lamps connected to each and every other terminal interconnected therewith in the wiring of the unit under test and the standard unit. All the corresponding terminals of the unit under test and the standard unit that are similarly interconnected with the terminal in the associated unit to which power is supplied will glow when switch 16 is in both positions. These continually glowing lamps will indicate a correspondence in the wiring in the unit under test and the standard unit. Any lamps, however, connected to a terminal in a standard unit or the unit under test which are not correspondingly interconnected, e.g., any such terminals which may be interconnected with the terminal to which power is supplied in the unit under test while the corresponding terminal in the standard unit is not so interconnected will glow only on alternate half cycles. This will produce a flickering indication which calls attention to a wiring discrepancy. The location of such a discrepancy is identified by appropriate markings next to each neon lamp in display unit 33 to indicate the identity of its associated terminal in the unit under test and the standard unit.

As already explained in connection with FIG. 2, resistors 52 and 53 are utilized to form a voltage divider with a respectively connected resistor 47 in the display unit. This is to prevent the application of a sufficiently high voltage to ignite the neon lamps through the wiring of the unit to which power is not being supplied through switch 16 at any particular instant, thereby giving an erroneous continuity indication. Capacitors 115 and 116 are utilized to form an arc suppression filter for the contacts of switch 16.

When a wiring error is indicated by a flashing light indication, the stepping switch drive mechanism 39 should be stopped in the position where such a discrepancy is indicated and switch 85 thrown first to the standard position and then to the test position for a comparison of the lamps which are illuminated in each of these positions. With the switch in the standard position, power is supplied during both halves of the switching cycle of switch 16 to each of the neon lamps associated with a terminal interconnected with the terminal to which power is directly applied through stepping switch 19. Thus, all of such interconnected neon lamps will glow relatively steadily. The same is true when switch 85 is thrown to the test position for the lamps receiving power through the unit under test. Thus, if any lamps do not light in the test position but do light up in the standard position, this indicates that the wiring error is in the nature of a missing wire, while if any lamps do not light up with the switch in the standard position while they do ignite in the test position this indicates a misconnection. A short to ground or chassis may be located by throwing switch 85 to the test position and connecting switch 87 to ground. This connects positive terminal power source 14 to ground through current limiting resistor 90. If any of the terminals under test are grounded, power will therefore be supplied from power source 14 to their associated neon lamps and the glowing of any of these lamps will indicate such a short.

The motor driven cam 67 is exemplary of only one switching means that may be utilized. Electronic switching means or other types of switching means may be utilized. Stepping switch drive mechanism 39 operates to sequentially drive movable contacts 49a and 49b into contact with corresponding fixed contacts 43a, 44a, 45a, 46a, etc., and 43b, 44b, 45b, 46b, connected to the unit under test 28 and the standard unit 30 respectively. A drive mechanism which will successively make contact with between one to three contacts a second is contemplated although a slower rate may be utilized if it is so desired. Any standard stepping switch which will satisfy the particular requirements desired may be utilized. If so desired, manually operated switch means may be used in place of stepping switch 19.

The device of this invention thus provides a simple and reliable means for rapidly checking out the wiring of complicated electrical devices. In an operative embodiment of the device of the invention, the time required for the continuity testing of a unit having in the neighborhood of 5,000 wiring terminals was reduced from 130 hours using a voltohmeter to eight hours using the embodiment of the device of the invention.

While the invention has been described and illustrated in detail, it is to be clearly understood that the same is by way of illustration and example only and is not to be taken by way of limitation, the spirit and scope of this invention being limited only by the terms of the appended claims.

We claim:

1. A wiring tester for checking the wiring continuity in an electrical unit under test against that of a standard unit comprising a voltage source, means for alternately connecting one terminal of said voltage source to a selected terminal on said electrical unit under test and a corresponding selected terminal on said standard unit at a frequency of approximately 5 cycles per second, and display lamp means connected in series with said standard unit and said unit under test for producing a visual display indicative of the correspondence or non-correspondence between the wiring in said unit under test and said standard unit, the other terminal of said voltage source being connected to said display lamp means which comprises a plurality of neon lamps, a substantially steady state of said lamps being indicative of correspondence between the wiring of said standard unit and said unit under test and a flickering of one of said lamps being indicative of noncorrespondence therebetween.

2. A wiring tester for checking the wiring in an electrical unit having a plurality of terminals under test against that of a standard unit comprising a voltage source, excitation means for alternately connecting one terminal of said voltage source to a selected terminal on said electrical unit under test and a corresponding selected terminal on said standard unit at a frequency of approximately 5 cycles per second, and a display unit having a plurality of indicator devices, one terminal of each of said indicator devices being connected to a separate terminal on said unit under test and the corresponding terminal on said standard unit, the other terminals of said indicator devices being connected to the other terminal of said voltage source and automatic means for successively connecting said voltage source to excitation means for successive pairs of terminals at a rate substantially less than 5 cycles per second.

3. In a wiring tester for checking the wiring in an electrical unit to be tested against that of a corresponding standard unit, a direct current source, switch means for alternately connecting one of the terminals of said source to said unit to be tested and said standard unit at a rate of approximately five times per second, first and second stepping switches connected respectively between said switch means and said unit to be tested and said switch means and said standard unit, said stepping switches each having a movable contact and a plurality of fixed contacts, each of said fixed contacts of said first stepping switch being connected to a terminal on said unit to be tested, each of said fixed contacts of said second stepping switch being connected to a terminal on said standard unit, a display unit having a plurality of neon indicator lamps, each of said lamps being connected to a separate terminal on said standard unit and a corresponding terminal on said unit under test, and drive means for successively connecting the movable contacts of each of said stepping switches with corresponding fixed contacts thereof at a rate substantially less than 5 cycles per second.

4. The device as recited in claim 3 wherein said switch means comprises a motor, a cam driven by said motor, a switch driven by said cam, a power source, and a relay, said power source and said relay being connected in series circuit with said switch, said relay having a movable contact connected to said direct current source, said relay further having a first fixed contact connected to the movable contact of said first stepping switch and a second fixed contact connected to the movable contact of said second stepping switch.

5. In a wiring tester for checking the wiring in an electrical unit to be tested against that of a corresponding standard unit comprising a direct current source, a switch having a movable contact and a pair of fixed contacts, the movable contact of said switch being connected to one terminal of said power source, first and second stepping switches each having a movable contact and a plurality of fixed contacts, each of said stepping switch movable contacts being connected to a separate one of the fixed contacts of said switch, first drive means for driving said switch movable contact alternately into contact with each of said switch fixed contacts, each of the fixed contacts in said first stepping switch being connected to a separate terminal in said unit to be tested, each of the fixed contacts on said second stepping switch being connected to a separate terminal in said standard unit, a display unit having a plurality of indicator lamps, each of said indicator lamps being connected to a separate terminal on said unit under test and the corresponding terminal on said standard unit, and second drive means for successively driving the movable contact of each of said stepping switches into engagement with corresponding ones of the fixed contacts thereof, said first drive means having an alternating rate such that the operation of a given indicator lamp by a signal solely from an associated one of a terminal on said unit under test and a corresponding terminal on said standard unit provides a visually discontinuous display while operation of said indicator lamp alternately by signals from both said terminals provides a visually continuous display, and said second drive means having a switching rate substantially less than said alternating rate.

6. The device as recited in claim 5 and additionally comprising selector switch means interposed between said switch and said stepping switches for alternatively connecting said switch alternately to said first and second stepping switches, continually to said first stepping switch, or continually to said second stepping switch.

References Cited by the Examiner

UNITED STATES PATENTS

| | | | |
|---|---|---|---|
| 2,488,556 | 11/49 | Parmenter | 324—66 |
| 2,505,072 | 4/50 | Sunstein | 324—57 |
| 2,508,478 | 5/50 | Uehling | 324—62 |
| 2,616,948 | 11/52 | Cannon | 324—57 |
| 2,769,957 | 11/56 | Zito et al. | 324—57 |
| 2,814,774 | 11/57 | Wong | 324—51 |
| 2,851,657 | 9/58 | Smith | 324—51 |
| 2,943,258 | 6/60 | Shawhan | 324—57 |
| 2,988,694 | 6/61 | Hessinger et al. | 324—73 |
| 3,050,680 | 8/62 | Fox | 324—51 |

FOREIGN PATENTS 431,731    7/35    Great Britain.

WALTER L. CARLSON, *Primary Examiner.*

SAMUEL BERNSTEIN, *Examiner.*